United States Patent Office 3,256,204
Patented June 14, 1966

3,256,204
METAL OXIDE AQUASOLS AND THEIR PREPARATION BY LIQUID-LIQUID ION EXCHANGE
Thomas L. O'Connor, Dedham, Mass., assignor to Diamond Alkali Company, Cleveland, Ohio, a corporation of Delaware
No Drawing. Filed Feb. 13, 1963, Ser. No. 258,162
13 Claims. (Cl. 252—301.1)

This application is a continuation-in-part of copending application Serial No. 19,449 filed April 4, 1960, and now abandoned.

This invention relates to metal oxide sols. More particularly, it relates to a novel method for the preparation of polyvalent metal oxide aquasols, and to novel sols with improved properties prepared by this method.

Metal oxide aquasols have previously been prepared by various methods, including ion exchange, dialysis, electro-osmosis and the like. A typical prior art method may be found in U.S. Patent No. 2,438,230, wherein aquasols of the oxides of metals such as aluminum, chromium, nickel, cobalt and iron are produced by passing an aqueous solution of a salt of said metal through a mass of alkali-regenerated anion exchange material, whereby the anion of said salt is abstracted with the formation of an aquasol of the metal oxide. The concentration of the salt solution is noted as not exceeding 1% by weight of the solution to be treated.

A primary object of the present invention is to provide an improved method for producing metal oxide aquasols.

Another object is to provide improved means for controlling the characteristics of metal oxide aquasols for the use to which such products are adapted.

Still another object is to provide free-flowing metal oxide aquasols of more stable and uniform particle size with a higher metal oxide concentration than has previously been obtainable.

According to the novel method of this invention for preparing polyvalent metal oxide aquasols, the solubilizing ions are removed from an aqueous solution of a salt of the desired metal by intimately mixing said solution with a solution in a water-immiscible organic solvent of a high molecular weight, water-insoluble organic compound selected from the group consisting of alkyl acids and alkyl amines, said organic solvent being one in which said organic compound is substantially soluble. The mixture is then allowed to separate into an organic and an aqueous phase, and the aqueous phase, which comprises the metal oxide aquasol, is removed.

The method of this invention permits the production of metal oxide aquasols by a more economical and efficient means than does the use of a granular ion exchange resin or zeolite. It constitutes a distinct improvement over the granular resin method in, for example, the type and amount of equipment necessary, the amount of time required for the exchange and for regeneration of the ion exchange material, and the manipulations involved in handling and transferring the ion exchange material. In addition, there is no loss of sol in the interstices of the resin, and washing of the resin to minimize such losses is not required.

It has been found that the solvent extraction method disclosed herein is a much more flexible and generally applicable system than is preparation by utilization of a granular ion exchange resin. For example, when an ion exchange resin is used, the active exchange area is a fixed concentration of the solid phase. In the method of this invention, on the other hand, the concentration of the active species is easily varied to give the optimum exchange rate for preparation of a sol of the desired particle size and stability. Still another advantage lies in the variety of solvent systems available to meet the varied requirements of a wide variety of metals. For example, it is preferable to use a weakly basic anion exchange material for the preparation of a stable, highly concentrated chromia aquasol. Commercially available weakly basic anion exchange resins are not satisfactory since their chemical nature is such that they absorb chemically an appreciable amount of trivalent chromium. This problem is not encountered when the solvent extraction method of this invention is used, if the organic solution comprises, for example, di-(tridecylamine) in kerosene.

The methods suitable for conversion into sols by the method of this invention are those whose oxides which are insoluble in water but at least one of whose salts is soluble in water. Such metals include, for example, silicon, chromium, nickel, iron, aluminum, barium, calcium, copper, magnesium, thorium and uranium.

Any soluble salt of a metal as defined hereinabove may be used. For the preparation of a silica aquasol, the most convenient salts are the alkali metal silicates, particularly sodium silicate. For the preparation of aquasols of other metals, suitable salts include, for example, the nitrates, chlorides and other halides, sulfates, and phosphates.

Since the solubilizing ions in an alkali metal silicate solution are the cations, the organic compound used for their removal is a high molecular weight, water-insoluble alkyl acid. Preferred acids are the alkyl phosphoric, sulfuric and carboxylic acids having a molecular weight between about 200 and 600, particularly phosphoric and sulfuric acids containing alkyl groups such as 2-ethylhexyl, n-octyl, 3,5,5-trimethylhexyl, heptadecyl, 4-ethyl-1-isobutyloctyl and the like.

In solutions of other metals salts, the anions are the solubilizing ions. For their removal, high molecular weight, water-insoluble alkyl amines may be employed. (The term "amines" as used herein is intended to include quaternary ammonium bases.) Particularly useful are amines in the 200–600 molecular weight range, such as trioctylmethylammonium hydroxide, trioctylamine, di-(tridecylamine), and mixtures of isomers of primary amines (preferably t-$C_{18}H_{37}NH_2$ to t-$C_{21}H_{43}NH_2$)

The organic solvent must be one which is immiscible with water and in which the organic acid or base is substantially soluble, and it should also provide a high rate of extraction, as compared to water, of the salt of the organic acid or base. The extraction rate tends to be highest when the solvent is an aliphatic hydrocarbon such as hexane or kerosene, decreases considerably when halogenated hydrocarbon solvents such as carbon tetrachloride and chloroform or aromatic hydrocarbons such as benzene are used, and is extremely low when polar solvents are used. Therefore, the preferred solvents for the extraction are kerosene and similar compounds which not only provide high extraction rates but also possess high flash points and are relatively low in cost. In order to reduce the possibility of contamination of the sol by impurities in the solvent, the latter may first be scrubbed with a solution of sodium carbonate.

In the method of this invention, the organic compound is dissolved in a water-immiscible solvent as described hereinabove, in a concentration sufficient to extract the quantity of solubilizing ions required to achieve the desired metal oxide/counterion ratio. This concentration is typically from about 0.5 M to 2.0 M. The organic phase is then allowed to contact a vigorously agitated aqueous solution of a salt of the appropriate metal, at a rate determined by the average metal oxide particle size desired. The resulting mixture is agitated for a suitable length of time, usually at least one-half hour. Then the agitation is stopped and the mixture is allowed to separate into two layers. The aqueous phase containing the metal oxide sol is separated and may be evaporated to a smaller volume to increase the concentration of said metal oxide, or diluted with water to decrease the concentration of the same. The organic phase is shaken with an aqueous solution of an inorganic acid or base to reconvert the salt of the organic base or acid contained therein to the free base or acid. For acids, the regenerating material may be, for example, sulfuric or phosphoric acid; for bases, sodium carbonate is preferable.

In another embodiment of the method of this invention, a continuous recirculating system is employed wherein the feed solutions of metal salt solution and high molecular weight organic acid or base solution are simultaneously and continuously fed, with vigorous agitation, to a reactor which may be charged with water or with some previously prepared metal oxide sol as a "seed" upon which particles of the formed metal oxide sol may grow. The formation and removal of the aqueous phase of the metal oxide sol are then effected. The spent solvent which overflows the reactor is continuously recirculated through the regenerating material, and the regenerated solvent is continuously reintroduced into the reactor simultaneously with the metal salt feed solution.

Liquid third phases may occur during the extraction, resulting in losses of solvent and metal oxide sol. These phases consist of relatively small layers of water saturated with the organic solvent and containing some of the sol lying between the metal oxide sol layer and the organic solvent layer. In order to prevent the losses which attend this formation of a third phase and also to simplify operations, a modifier may be added to the organic solvent. It has been found that long-chain branched primary alcohols serve best as modifiers in this process, eliminating entirely this undesirable formation. Less satisfactory in this respect are the more highly branched secondary alcohols, although caprylyl alcohol is effective. Among the primary alcohols, 2-ethylhexanol and 4-ethyloctanol are particularly useful. Other alcohols useful as modifiers include undecanol, diisobutylcarbinol, tetradecanol and trimethylnonanol. The amount of modifier that is added varies with the organic reagent, its concentration, the alcohol used as modifier and the temperature at which the extraction is to be carried out; in general, however, it need not be greater than about 10% by volume. The third phase is most often found when the solvent is an aliphatic hydrocarbon such as kerosene, less often or not at all when the diluent is an aromatic hydrocarbon or a halogenated hydrocarbon. When use of an alcohol modifier is necessary, there is a tendency for some water to be lost from the salt solution by passage into the solvent layer; however, these losses can be readily compensated for by employing a more dilute salt solution.

Sols produced by the method of this invention may have a particle size between about 1 and 100 millimicrons and a total metal oxide concentration at least as high as 10% by weight, and often 15% or higher. In particular, it has been found that stable aquasols of ferric oxide, chromia, thoria, urania and mixtures thereof, may be prepared which remain fluid and free-flowing at total metal oxide concentrations above about 10%. Such sols are a distinct improvement over those disclosed in the prior art, which become viscous and gel-like at these concentrations.

The properties of the sols produced by the method of this invention can be varied by changing the manner of effecting contact between the metal salt solution and the organic solution, the contact time, and the temperature at which the process is carried out. The average particles size varies inversely with the rate of addition of the components. Extractions carried out at about room temperature produce sols having an average particle size of between 0.1 and 10 millimicrons and usually between 1 and about 3 millimicrons, whose metal/counterion ratio can be predetermined by regulating the period of time of contact to give optimum stability to the sol. If the extractions are carried out at higher temperatures (up to about 100° C.), and especially if "seed" nuclei are used, the resulting sol will contain metal oxide particles having larger diameters, the increase in size being a function of the temperature as well as the size of the nuclei.

The sols of the present invention are useful, for example, as reagents in the manufacture of various chemical products, such as in the ceramic and refractory industries; as medicinals; as additives to oils, lubricants, hydrocarbon fuels and the like; as colorants for plastics; and as catalyst modifiers.

The following examples are given in order that those skilled in the art may more completely understand the invention and the preferred means by which the same may be carried into effect.

EXAMPLE 1

*Preparation of a silica sol*

PART A

In a polyethylene beaker, 216 ml. of a 5% sodium silicate solution is agitated vigorously as a mixture of 10% (by volume) di-(2-ethylhexyl)-phosphoric acid, 4% isodecanol and 86% kerosene is added at a logarithmic rate over a period of five hours and thirty-five minutes. The temperature is maintained at 25° C. during the reaction. The phases are allowed to separate and the organic phase is shaken with N $H_2SO_4$ to regenerate the acid. The aqueous phase is evaporated to a silica content of 20%. The resulting sol has a $SiO_2:Na_2O$ mole ratio of 13 and an average silica particle size of 1.4 millimicrons.

PART B

Another 216 ml. portion of the sodium silicate solution used in Part A is agitated and the regenerated organic solution of Part A is added thereto at a constant rate over one and one-half hours. The resulting silica sol is evaporated to a silica content of 20%; the average silica particle size is 0.9 millimicron.

PART C

A sodium silicate solution and an organic solution as in Part A are added simultaneously to 100 ml. of water, with agitation, at a logarithmic rate over a period of three hours and fifty minutes. The temperature is maintained at 42° C. The sol thus formed, after evaporating to a silica content of 24%, has an average silica particle size of 9.9 millimicrons.

EXAMPLE 2

*Preparation of a chromia sol*

A vertical glass reactor is charged with 67 ml. of water and heated to 95–100° C. A mixture of 85% (by volume) kerosene, 10% di-tridecylamine and 5% isodecanol is added at the rate of 70 ml. per minute, simultaneously with 133 ml. of an aqueous chromic chloride solution containing the equivalent of 20 g. of $Cr_2O_3$; the latter is introduced at the rate of 0.74 ml. per minute. The two streams are rapidly mixed by means of a propeller-type agitator. The top of the reactor is baffled so as to promote separation of the aqueous and organic phases. The organic solution which overflows the reactor is regenerated by passage through two stages of sodium carbonate and several washing stages, heated to 50° C. and returned to the reactor.

Circulation of the organic phase is continued for three hours, during which time 12.5 liters of the same is passed through the reactor. At the end of this period, the mixture is allowed to cool and the aqueous phase is withdrawn. The product is a free-flowing chromia sol containing 10% $Cr_2O_3$, the average particle size of which is 6.2 millimicrons.

EXAMPLE 3

*Preparation of a ferric oxide sol*

A vertical glass reactor, as used in Example 2, is charged with 50 ml. of water. The temperature is maintained at 100° C. as an aqueous solution containing 506 g. per liter of ferric nitrate nonahydrate, and a solution containing 10% (by volume) tricaprylylamine, 10% isodecanol and 80% kerosene, are passed in at the rates of 5.9 ml. per minute and 131 ml. per minute, respectively, as in Example 2. A total of 350 ml. of ferric nitrate solution is used, and 8.5 liters of organic solution is recirculated through the reactor.

Upon separation of the aqueous and organic phases, a free-flowing ferric oxide aquasol is obtained which contains 10.7% ferric oxide with an average particle size of 56.5 millimicrons.

EXAMPLE 4

*Preparation of a thoria sol*

PART A

Two hundred milliliters of an aqueous thorium nitrate solution, containing the equivalent of 40 grams of thorium oxide, and a solution comprising 15% (by volume) mixed $C_{18-20}$ primary amines, 5% isodecanol and 80% kerosene, are passed simultaneously into a reactor at 100° C. as in Example 2, at the rates of 0.80 and 125 ml. per minute, respectively. Recirculation of the organic solution is continued for 250 minutes. The product is an aqueous, free-flowing thoria sol containing 200 g. per liter of thorium oxide with an average particle size of 9.5 millimicrons.

PART B

A thoria sol is caused to "grow" to a particle size of 56 millimicrons by means of the following procedure.

The thoria sol of Part A is charged into the reactor as a "seed", and thorium nitrate solution and organic amine solution are added at 100° C. The amine solution contains 10% (by volume) di-tridecylamine, 5% isodecanol and 85% kerosene, and the rate of its addition is maintained in each step at 146 ml. per minute for four hours. The "seed" in the first step is the sol of Part A, and in each succeeding step the "seed" is the product of the previous step. Results are given in the following table. The final product is a free-flowing sol similar in properties (except for particle size) to the product of Part A.

| Step | "Seed" Vol., ml. | $Th(NO_3)_4$ Volume, ml. | $ThO_2$ Equiv., g. | $Th(NO_3)_4$ Addn. rate, ml. per min. | Sol concn., g. per liter | Sol. avg. particle size, millimicrons |
|---|---|---|---|---|---|---|
| 1 | 25   | 175   | 35   | 0.73 | 200 | 19.7 |
| 2 | 37.5 | 162.5 | 32.5 | 0.68 | 200 | 35   |
| 3 | 50   | 150   | 30   | 0.63 | 200 | 56   |

PART C

Sols of urania (which is isomorphous with thoria), and sols containing mixtures of thoria and urania, may also be prepared by the methods of Parts A and B.

Although the invention has been described with particular reference to specific embodiments thereof, it is not to be so limited, since changes and modifications therein may be made which are within the full intended scope of the invention as defined in the appended claims.

What is claimed is:

1. A method for the preparation of a polyvalent metal oxide aquasol of a metal whose oxide is insoluble in water but at least one of whose salts is soluble in water, which method comprises the steps of removing the solubilizing ions from an aqueous solution of a salt of said metal by intimately mixing said solution with a solution in a water-immiscible organic solvent of a high molecular weight, water-insoluble organic compound selected from the group consisting of alkyl acids and alkyl amines, said organic solvent being one in which said organic compound is substantially soluble; allowing the mixture to separate into an organic and an aqueous phase; and removing the aqueous phase which comprises said metal oxide aquasol.

2. The method according to claim 1 wherein a modifier comprising a long-chain branched primary alcohol is added to the organic solution.

3. The method according to claim 1 wherein the metal is selected from the group consisting of silicon, chromium, nickel, iron, aluminum, barium, calcium, copper, magnesium, thorium and uranium.

4. The method according to claim 1 wherein the metal is silicon and the organic compound is an alkyl acid selected from the group consisting of alkyl sulfuric, phosphoric and carboxylic acids.

5. The method according to claim 4 wherein a modifier comprising a long-chain branched primary alcohol is added to the organic solution.

6. The method according to claim 1 wherein the metal is one which exists in solution in cationic form, and the organic compound is an alkyl amine.

7. The method according to claim 6 wherein a modifier comprising a long-chain branched primary alcohol is added to the organic solution.

8. The method according to claim 7 wherein the metal is chromium.

9. The method according to claim 7 wherein the metal is iron.

10. The method according to claim 7 wherein the metal is thorium.

11. The method according to claim 7 wherein the metal is uranium.

12. A continuous method for the preparation of a polyvalent metal oxide aquasol of a metal whose oxide is insoluble in water but at least one of whose salts is soluble in water; which method comprises the steps of introducing a small quantity of metal oxide aquasol into a reactor as a "seed"; continuously and simultaneously introducing into said reactor an aqueous solution of a salt of said metal and a solution in a water-immiscible organic solvent of a high molecular weight, water-insoluble organic compound selected from the group consisting of alkyl acids and alkyl amines, said organic solvent being one in which said organic compound is substantially soluble; intimately mixing said solutions and "seed" sol; continuously removing the mixture from the reactor and allowing it to separate into an organic and an aqueous phase; removing said aqueous phase which comprises said metal oxide aquasol; continuously regenerating said organic phase by passing the same through an aqueous regenerating solution, and returning the regenerated organic phase to the reactor.

13. The method according to claim 12 wherein a modifier comprising a long-chain branched primary alcohol is added to the organic solution.

References Cited by the Examiner

UNITED STATES PATENTS

| | | | |
|---|---|---|---|
| 2,329,147 | 9/1943 | Troch et al. | 252—301.1 |
| 2,438,230 | 3/1948 | Ryzner | 252—313 |
| 2,590,833 | 4/1952 | Bechtold et al. | 252—313 |
| 3,098,044 | 7/1963 | Glover | 252—313 |

FOREIGN PATENTS 379,133  8/1932  Great Britain.

OTHER REFERENCES

Hackh's Chemical Dictionary, 3rd Edition, The Blakiston Co., (1944), pp. 213 and 785.

L. DEWAYNE RUTLEDGE, *Acting Primary Examiner.*

CARL D. QUARFORTH, REUBEN EPSTEIN, BENJAMIN R. PADGETT, *Examiners.*

L. A. SEBASTIAN, J. D. VOIGHT, A. G. BOWEN, *Assistant Examiners.*